United States Patent
Moeker et al.

(10) Patent No.: US 9,821,757 B2
(45) Date of Patent: Nov. 21, 2017

(54) SAFETY BELT DEVICE IN A VEHICLE

(71) Applicant: Volkswagen Aktiengesellschaft, Wolfsburg (DE)

(72) Inventors: Carsten Moeker, Ruehen (DE); Tom Meyner, Isenbuettel (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 9 days.

(21) Appl. No.: 15/044,735

(22) Filed: Feb. 16, 2016

(65) Prior Publication Data

US 2016/0159315 A1    Jun. 9, 2016

Related U.S. Application Data

(63) Continuation of application No. PCT/EP2014/066686, filed on Aug. 4, 2014.

(30) Foreign Application Priority Data

Aug. 16, 2013    (DE) .................. 10 2013 216 326

(51) Int. Cl.
- B60R 22/185 (2006.01)
- B60R 22/18 (2006.01)
- A44B 11/25 (2006.01)

(52) U.S. Cl.
CPC .......... *B60R 22/18* (2013.01); *A44B 11/2553* (2013.01); *A44B 11/2561* (2013.01);
(Continued)

(58) Field of Classification Search
CPC ........ B60R 22/1855; B60R 2022/1812; B60R 22/18; A44B 11/2553
See application file for complete search history.

(56) References Cited

U.S. PATENT DOCUMENTS

| | | |
|---|---|---|
| 4,979,764 A | 12/1990 | Drinane et al. |
| 5,100,176 A | 3/1992 | Ball et al. |

(Continued)

FOREIGN PATENT DOCUMENTS

| | | |
|---|---|---|
| DE | 90 01 285 U1 | 8/1990 |
| DE | 42 15 384 A1 | 11/1992 |

(Continued)

OTHER PUBLICATIONS

Korean Office Action for Korean Application No. 10-2016-7006776 dated Feb. 2, 2017 with English translation.

*Primary Examiner* — Abigail Troy
(74) *Attorney, Agent, or Firm* — Muncy, Geissler, Olds & Lowe, P.C.

(57) ABSTRACT

A belt fitting for a safety belt device in a vehicle that includes a base segment and an insertion tongue connected thereto, in which base segment a belt eye is provided, through which a belt webbing is guided and divides the belt webbing into a shoulder belt segment and a lap belt segment when the safety belt is worn. The belt fitting has a clamping element movable between a release position, such that the belt webbing is freely movable in sliding contact over at least one belt running surface, and a clamping position, in which the belt webbing is tightly clamped between a clamping stop on the base segment and the clamping element in the event of a load or crash. The belt running surface of the belt fitting has a surface contour, which ensures stable transverse guidance of the belt webbing in the event of a load.

9 Claims, 5 Drawing Sheets

(52) U.S. Cl.
CPC ...... *A44B 11/2569* (2013.01); *B60R 22/1855* (2013.01); *B60R 2022/1812* (2013.01)

(56) References Cited

U.S. PATENT DOCUMENTS

| | | | |
|---|---|---|---|
| 7,325,280 B2 * | 2/2008 | Ichida | A44B 11/2557 24/170 |
| 7,325,835 B2 | 2/2008 | Janz | |
| 2012/0068520 A1 | 3/2012 | McFalls et al. | |

FOREIGN PATENT DOCUMENTS

| | | |
|---|---|---|
| DE | 198 32 467 A1 | 1/2000 |
| DE | 10 2005 034 804 B3 | 10/2006 |
| KR | 10-0683032 B1 | 2/2007 |

\* cited by examiner

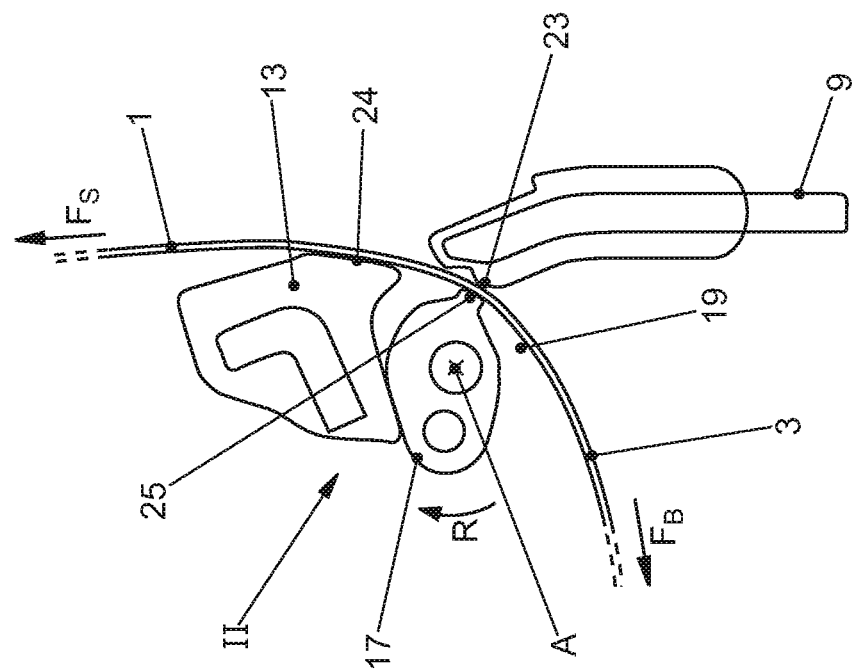
FIG. 4
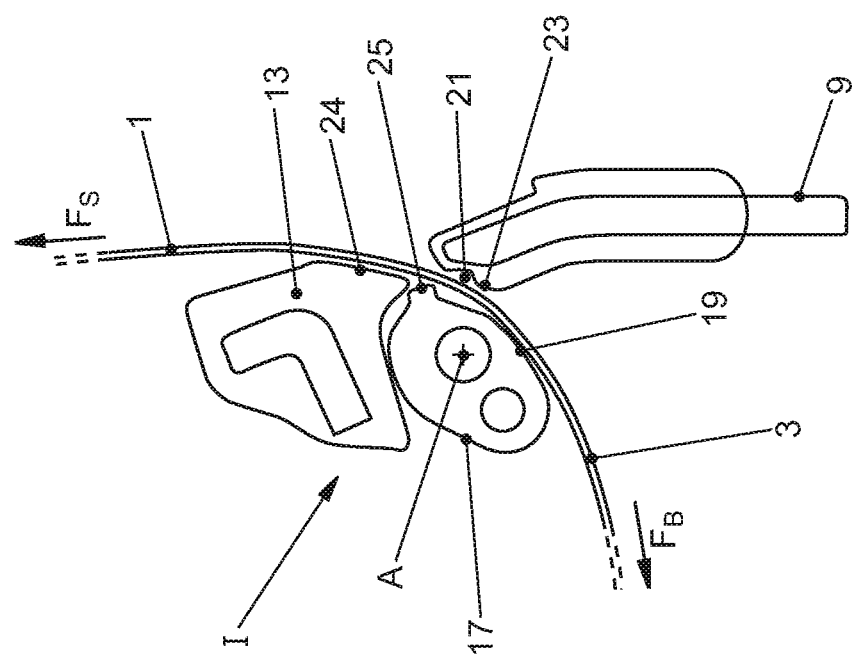
FIG. 3 Section I-I

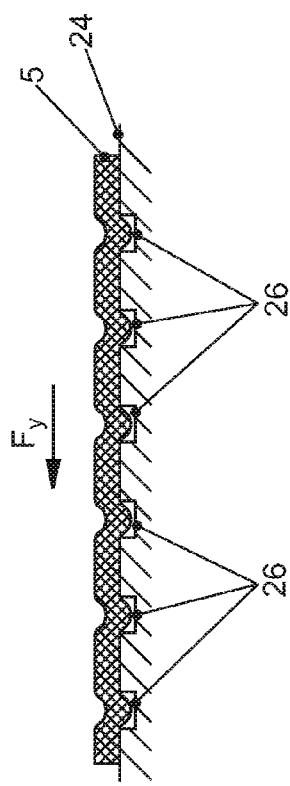
FIG. 7
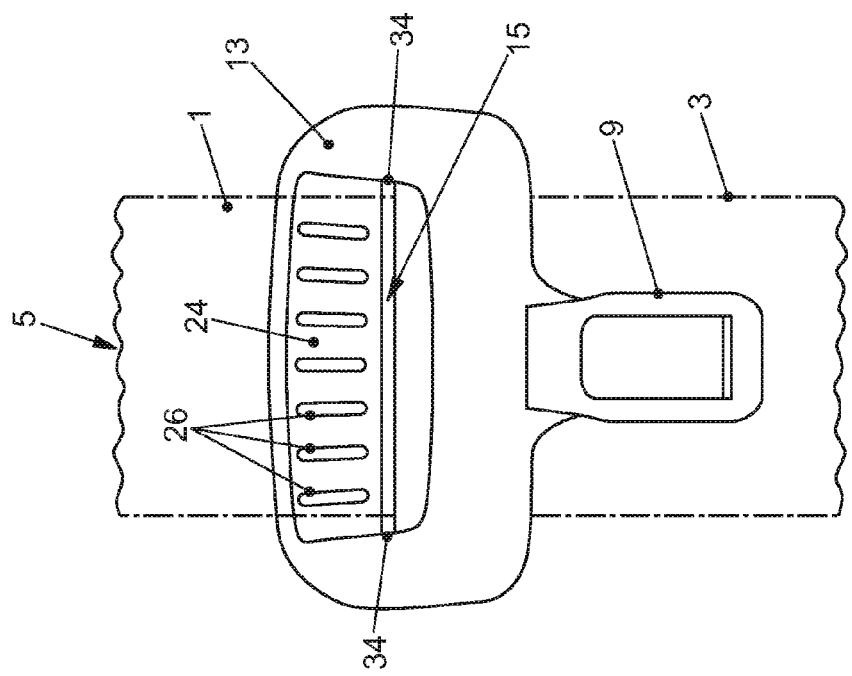
FIG. 8 Section II-II
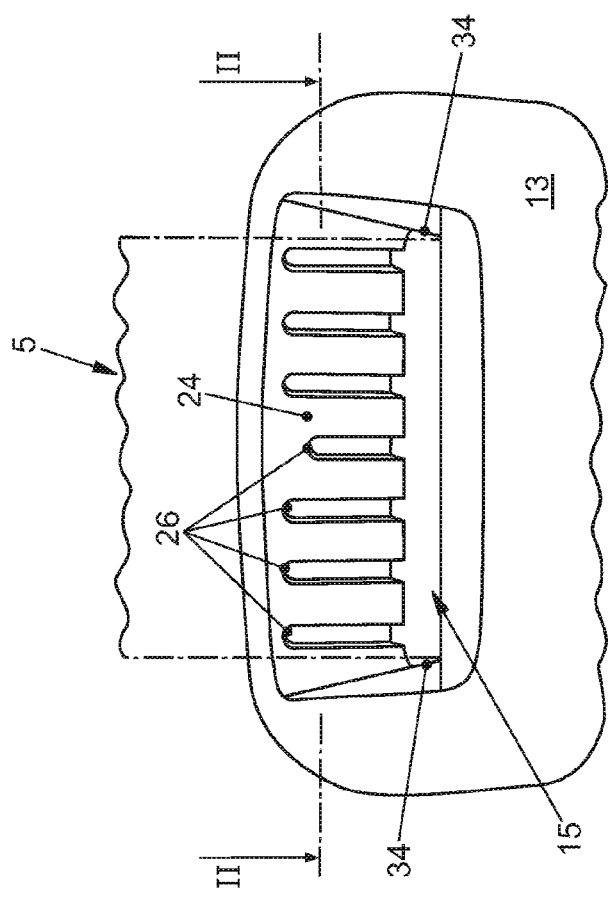
FIG. 6

SAFETY BELT DEVICE IN A VEHICLE

This nonprovisional application is a continuation of International Application No. PCT/EP2014/066686, which was filed on Aug. 4, 2014, and which claims priority to German Patent Application No. 10 2013 216 326.6, which was filed in Germany on Aug. 16, 2013, and which are both herein incorporated by reference.

BACKGROUND OF THE INVENTION

Field of the Invention

The invention relates to a belt fitting for a safety belt device in a vehicle and to a safety belt device/arrangement.

Description of the Background Art

A safety belt device of a vehicle may have, for example, a lap belt as well as shoulder belt which runs diagonally over the torso of the vehicle occupant. When the safety belt is buckled, the lap belt is anchored on the vehicle body via two laterally diametrically opposed, lower connecting points. The buckling point, which is situated on the inside in the transverse direction of the vehicle, is usually designed to be detachable with the aid of a belt fitting provided on the belt webbing, whose insertion tongue is insertable into a belt buckle anchored on the vehicle body side.

A belt fitting according to the definition of the species, which comprises a base segment and an insertion tongue connecting thereto, is known from DE 42 15 384 A1, which corresponds to U.S. Pat. No. 5,100,176. A belt eye, through which a belt webbing is guided, is provided in the base segment. When the security belt is buckled, the belt fitting inserted into the belt buckle divides the belt webbing into a lap belt segment and a shoulder belt segment. To arrest the lap belt segment of the belt webbing in the event of a crash, a clamping element is provided, which is shiftable between a release position, in which the belt webbing is freely movably guided through the belt eye, and a clamping position, in which the belt webbing is tightly clamped between the clamping element and a clamping stop, which acts as an abutment, with the aid of a clamping force. The clamping element is pivotable around a pivot axis between the release position and the clamping position and is elastically pretensioned in the direction of the release position. During normal vehicle operation, the belt webbing is thus freely movably guided over the belt running surfaces of the belt fitting. Conversely, in the event of a crash, increased belt forces act upon the clamping element. As a result, the clamping element is translocated in a rotation direction to the clamping position, in which the belt webbing is tightly clamped between the clamping element and the clamping stop with the aid of the clamping force.

In the prior art, the clamping element has a clamping piece which runs in the transverse direction of the belt webbing. In the clamping position, the clamping piece is in linear contact with the belt webbing, running continuously between the two outer edges of the belt webbing in the transverse direction of the belt webbing. In this way, a linear, even or constant clamping force distribution results between the two outer edges of the belt webbing throughout the transverse direction of the belt webbing.

In dynamic safety tests, it was determined that the belt webbing fabric tightly clamped between the clamping element and the clamping stop may be subjected to excessively high stress in the event of a crash, whereby it must have a reinforced design.

SUMMARY OF THE INVENTION

It is therefore an object of the invention to provide a belt fitting for a safety belt device in a vehicle, which increases the dependability of the safety belt device in the event of a crash.

In particular, the invention is based on the fact that the belt buckle is mounted, in an exemplary embodiment, on the vehicle bodyshell via a torsionally weak, flexible steel cable. In the dynamic safety tests mentioned above, it was found that a belt buckle affixed in such a flexible manner twists in a pulse-like fashion together with the belt fitting inserted therein. During this belt buckle twisting motion, a transverse force component is applied to the belt webbing in the area of the belt eye of the belt fitting. This results in a transverse shifting of the belt webbing into the corner area of the belt eye. This results in a very high flex stress on the belt webbing material in the corner area of the belt eye, whereby this material is subjected to even greater stress.

The belt running surface of the belt fitting can be provided with a special surface contour. In the event of a load, in particular if the belt webbing is not yet tightly clamped, a stable transverse guidance of the belt webbing is provided by this surface contour and counteracts a transverse force component acting upon the belt webbing, thus preventing a transverse shifting of the belt webbing into the corner area of the belt eye. The above-mentioned surface contour in the belt running surface may have, for example, indentations, furrows or grooves, which are oriented in the longitudinal direction of the belt webbing. Alternatively, cross-furrows may also be provided. In the event of a load, the plastic material of the belt webbing guided through the belt eye may be pressed in a form-fitting manner into the indentations, whereby the transverse shifting of the belt webbing into the corner area of the belt eye may be dependably prevented.

When a safety belt is buckled, the belt fitting, viewed in the longitudinal direction of the belt webbing, may have belt running surfaces on opposite sides of the belt eye, over which the belt webbing is freely movably guided during normal operation. The belt running surfaces may be formed both on the clamping element and on the base segment of the belt fitting. For stable guidance of the belt webbing, the two belt running surfaces may each have the surface contour according to the invention. The indentations, furrows or grooves may be approximately 2.5 mm wide and approximately 1.5 mm deep. The indentations may also be provided equidistantly apart in the transverse direction of the belt webbing and extend over the entire belt running surface, viewed in the longitudinal direction of the belt webbing. With regard to an improved form fit between the belt webbing and the belt webbing running surface, the groove-shaped indentations may be open counter to the direction of movement of the belt webbing, i.e., they may have no limiting wall on the front side.

To implement a belt fitting according to the invention, the clamping element in the base segment of the belt fitting may be pivotable around a pivot axis between the release position and the clamping position. The clamping element may also be elastically pretensioned in the direction of the release position with the aid of a spring element. During normal vehicle operation, the belt webbing may be guided in sliding contact as well as freely movably over a belt running surface of the clamping element when the safety belt is buckled. In this case, the clamping element remains elastically pretensioned in its release position. Conversely, in the event of a crash, much higher belt forces act upon the belt fitting and thus also upon the clamping element. Upon the application of these higher belt forces, the clamping element may be translocated into the clamping position in a rotation direction. In this way, the lap belt segment of the safety belt is arrested in a safety-beneficial manner.

The clamping element may also have a clamping contour, with the aid of which the belt webbing is tightly clamped in the clamping position over the width of the belt webbing in a nonlinear and/or uneven distribution of clamping force. The belt running surface having the special surface contour is provided on the pivotable clamping element, leading in the rotation direction, while the clamping contour is disposed on the clamping element, trailing as viewed in the rotation direction.

The surface contour may extend continuously over the entire width of the belt webbing in the transverse direction of the belt.

The embodiments and/or refinements of the invention explained above and/or mentioned in the subclaims may be used individually or in any combination with each other.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 3 shows an enlarged sectional view along plane of intersection I-I from FIG. 1, in which the clamping element is shown in the release position;

FIG. 4 shows the clamping element in the clamping position in a view corresponding to FIG. 3;

FIGS. 6 and 7 each show different variants of the surface contour in the belt running surface of the belt fitting; and FIG. 8 shows a sectional view along plane of intersection II-II from FIG. 7.

DETAILED DESCRIPTION

Figure 1:
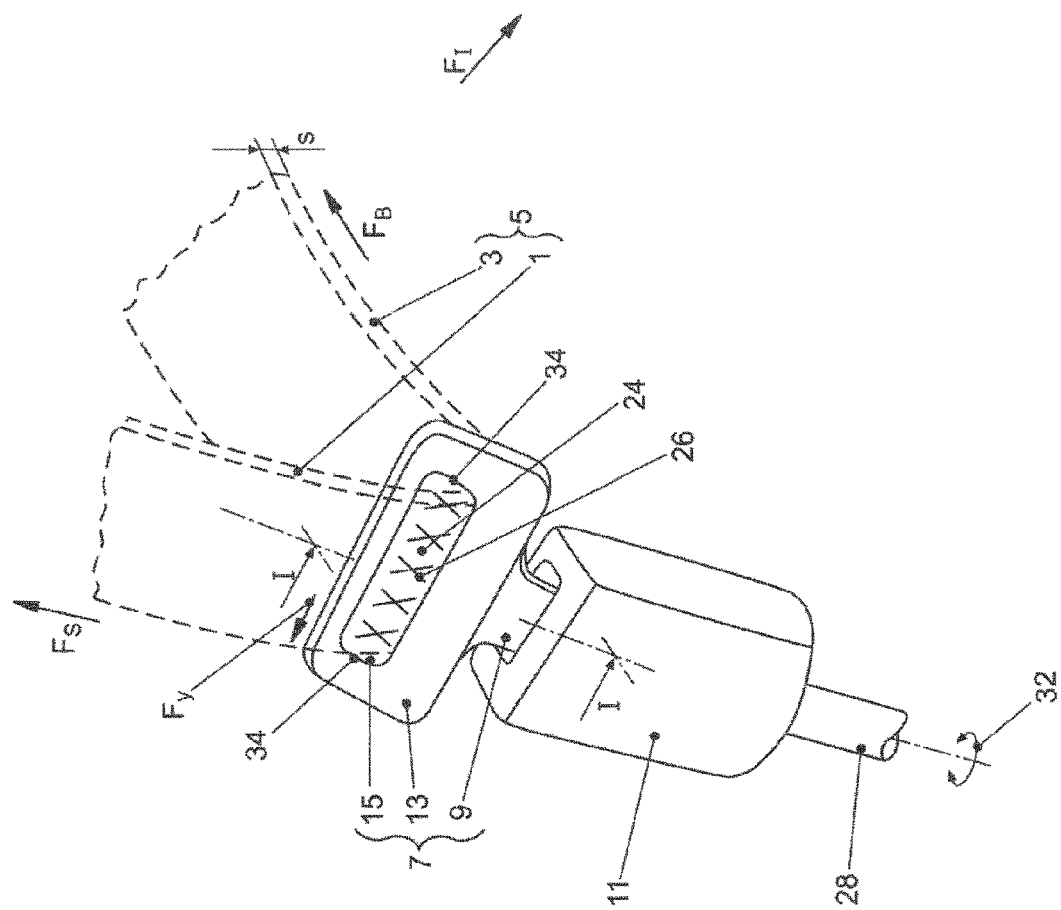
FIG. 1 shows a detail of a three-point safety belt device in a position of use, in which the vehicle occupant is buckled into the safety belt.

In the partial view in FIG. 1, a three-point safety belt formed by a shoulder belt segment 1 and a lap belt segment 3 is shown in a position of use, i.e., with the vehicle occupant buckled into the safety belt. The vehicle seat and the vehicle occupant are not illustrated for reasons of clarity. The upper end of shoulder belt segment 1, which is also not shown, is connected to a retractor, which is not illustrated and which is disposed, for example, in the center pillar. According to FIG. 1, lap belt segment 3 extends from an outer connecting point, which is not illustrated, to a belt fitting 7, which is inserted by an insertion tongue 9 into a belt buckle 11.

Belt fitting 7 is assembled from a base segment 13 and aforementioned insertion tongue 9. Base segment 13 of belt fitting 7 includes a belt eye 15, through which belt webbing 5 is guided. In the safety belt shown in the buckled state in FIG. 1, belt webbing 5 is divided into shoulder belt segment 1 and lap belt segment 3 at belt eye 15.

Figure 2:
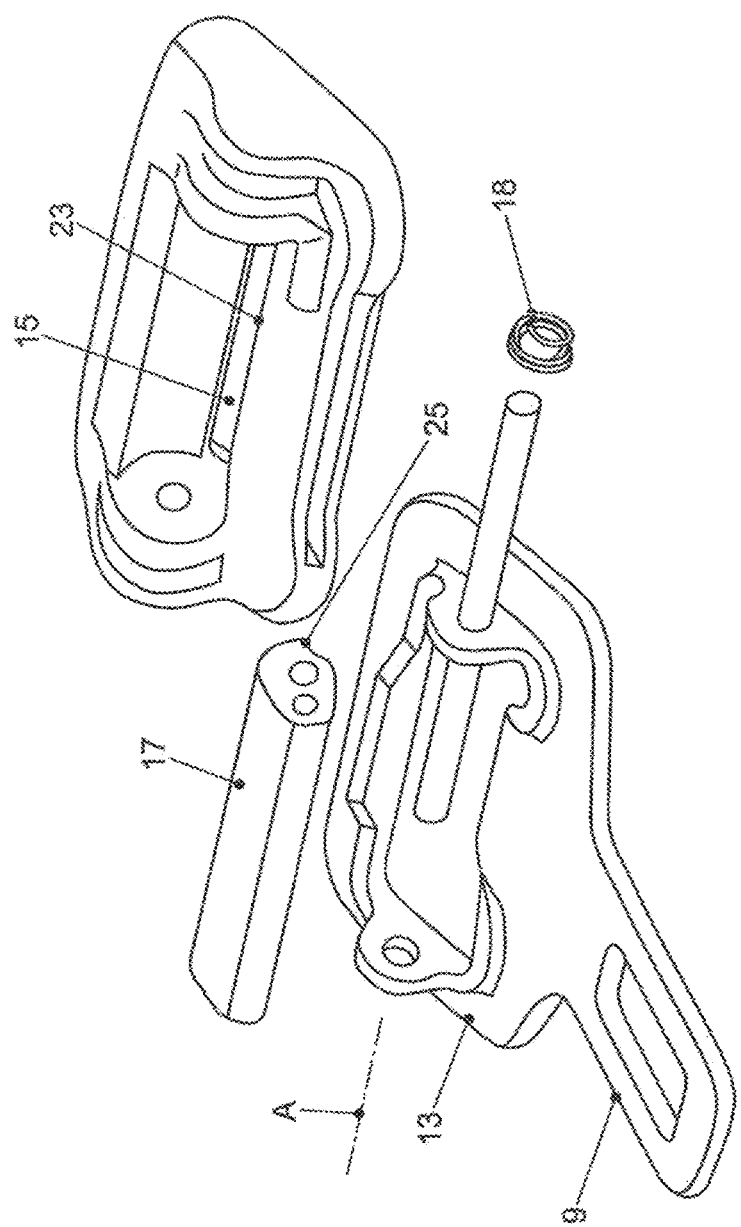
FIG. 2 shows the belt fitting in an exploded view.

As is apparent from FIGS. 2 and 3, a bar-shaped clamping element 17 is pivotably hinged around a pivot axis A on base segment 13 of belt fitting 7. During normal vehicle operation, clamping element 17 is elastically pretensioned with the aid of a spring 18 (FIG. 2) in the direction of a release position I shown in FIG. 3. In release position I, belt webbing 5 is freely movably guided in sliding contact over a belt running surface 19 of clamping element 17 and over a belt running surface 24 of base segment 13.

Together with a clamping shoulder 23 formed on base segment 13, clamping element 17 delimits a clamping gap 21 (FIG. 3) in release position I.

FIG. 4 shows the belt fitting in a load event, for example in a crash event. In the event of a crash, much higher belt forces $F_B$, $F_S$ act upon lap belt segment 3 and shoulder belt segment 1 of the safety belt. As a result, higher belt forces are also applied to clamping element 17, whereby it is translocated into clamping position II in a rotation direction R. In clamping position II, a clamping piece 25 molded onto clamping element 17 presses belt webbing 5 against clamping shoulder 23 with the aid of a clamping force $F_K$. In this way, lap belt segment 3 is arrested in a safety-beneficial manner in the event of a crash.

Figure 5:
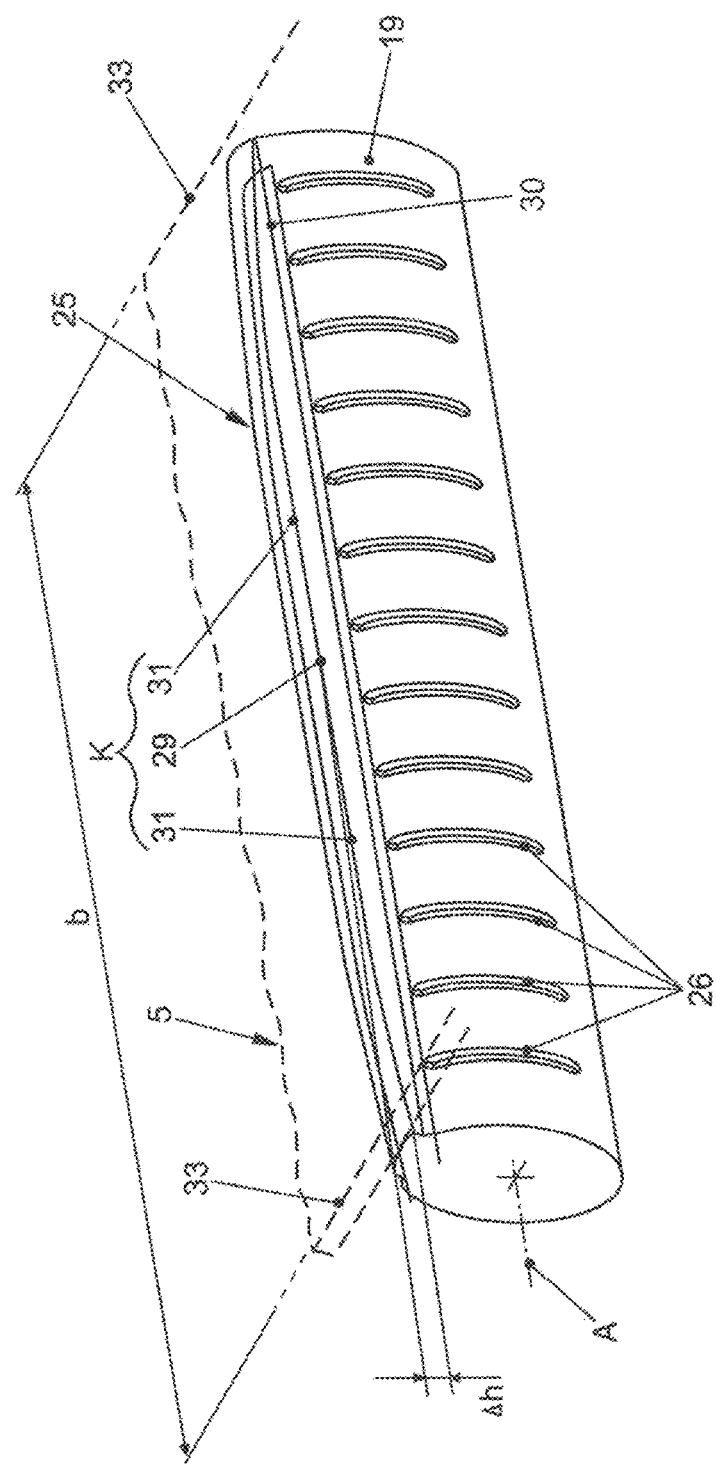
FIG. 5 shows the clamping element, whose belt running surface is provided with the surface contour, in a greatly enlarged and simplified schematic diagram.

According to FIG. 5, clamping piece 25 of clamping element 17 is not contoured in a linear and planar manner, but instead clamping piece 25 has a crown or bulge, with an apex 29 disposed approximately in the middle and with arc segments 31 descending laterally. According to FIG. 5, apex 29 as well as arc segments 31 descending laterally therefrom result in a clamping contour K, which results in clamping force distribution F(b) sketched over belt webbing width b. Apex 29 of the crown projects by a height Δh from a base surface 30 of clamping piece 25, which is smaller than or equal to belt webbing material thickness s (FIG. 1), which is usually in a range of 1.2 mm.

With the aid of clamping contour K shown in FIG. 5, no continuously linear and even course of the clamping force distribution results between the two belt webbing outer edges 33, but instead a nonlinear clamping force distribution results with a maximum clamping force in the middle of belt webbing 5. Accordingly, only a slight or possibly no clamping force at all is applied to outer edges 33 of belt webbing 5.

As mentioned above, belt webbing 5 is guided in release position I (FIG. 3) in sliding contact over belt running surface 19 of clamping element 17. In addition, other belt running surface 24, over which belt webbing 5 is guided in the buckled state of the safety belt, is provided on the opposite side of belt eye 15, viewed in the longitudinal direction of the belt webbing. As is apparent from FIG. 1 as well as from FIGS. 5 through 8, the two belt running surfaces 19, 24 each have a special surface contour 26, for example indentations, furrows or grooves, which are oriented in the longitudinal direction of the belt webbing (FIGS. 6 through 8), or alternatively they have cross-furrows (FIG. 1).

The function of this special surface contour 26 is described below on the basis of a crash event: In a crash event of this type, according to FIG. 1, the buckled-up vehicle occupant is accelerated forward in the direction of travel by a force $F_I$. The much higher belt forces $F_B$, $F_S$ also act upon belt fitting 7. Belt buckle 11, including belt fitting 7 inserted therein, is affixed to the vehicle bodyshell via flexible steel cable 28. Belt buckle 11, which is flexibly affixed in this manner, tends to twist in a pulse-like manner together with belt fitting 7 inserted therein in the event of a crash. During this belt buckle twisting (indicated in FIG. 1 by a double arrow represented by 32), a transverse force component $F_y$, which presses belt webbing 5 in the area of belt eye 15 in the direction of corner area 34 of belt eye 15, is applied to belt webbing 5 in the area of belt eye 15 of belt fitting 7. In the prior art, this results in a transverse shifting of belt webbing 5 into corner area 34 of belt eye 15 and consequently in a very strong flex stress of the belt webbing material in belt eye corner area 34, whereby damage may occur.

To avoid such a transverse shifting of belt webbing 5, belt running surfaces 19, 24 are designed with a special surface contour 26, for example furrows, grooves and/or cross-furrows. Due to increasing belt forces $F_S$ and $F_B$ in the event of a load, the plastic material of belt webbing 5 is pressed into the indentations in surface contour 26 of belt running surfaces 19, 24, as shown in FIG. 8. In this way, an increased form and friction fit results between belt webbing 5 and belt running surface 24 in the transverse direction, whereby transverse force component $F_y$ is effectively counteracted without resulting in a disadvantageous transverse shifting in the direction of corner area 34 of belt eye 15.

Clamping element 17 is shown on its own in FIG. 5. Its belt running surface 19 is provided with a surface contour 26 and is disposed upstream from clamping contour K in rotation direction R. In contrast to FIG. 1, in which belt running surface 24 of belt fitting 7 is formed by cross-furrows, surface counter 26 shown in FIG. 5 is formed by grooves which are disposed in parallel and which are oriented in the longitudinal direction of the belt webbing.

The same also applies to belt running surface 24 of belt fitting 7 shown in FIG. 6, in which surface contour 26 also has longitudinal, parallel grooves.

In FIG. 7, in another variant, the grooves are milled counter to the direction of movement of belt webbing 5, i.e., they have an open design without a limiting wall on the front side. In this way, the form fit between belt webbing 5 and belt running surface 24 may be increased.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A belt fitting for a safety belt device in a vehicle, the belt fitting comprising:
    a base segment and an insertion tongue connected thereto, wherein the base segment has a belt eye through which a belt webbing is guided and which divides the belt webbing into a shoulder belt segment and a lap belt segment when the safety belt device is buckled; and
    a clamping element that is adjustable between a release position, in which the belt webbing is freely movable in sliding contact over at least one belt running surface of the belt fitting, and a clamping position, in which the belt webbing is tightly clamped between a clamping stop on the base segment and the clamping element in the event of a load or a crash,
    wherein the at least one belt running surface of the belt fitting has a surface contour that ensures a stable transverse guidance of the belt webbing in the event of a load or crash if the belt webbing is not yet tightly clamped, the transverse guidance counteracting a transverse force component that acts upon the belt webbing,
    wherein the at least one belt running surface includes two belt running surfaces that are provided on opposite sides of the belt eye, viewed in a longitudinal direction of the belt webbing, wherein one of the two belt running surfaces is formed on the clamping element and another one of the two belt running surfaces is formed on the base segment, and wherein the two belt running surfaces are each provided with the surface contour, and
    wherein the surface contour includes indentations, furrows, grooves or cross-furrows oriented in a longitudinal direction of the belt webbing.

2. The belt fitting according to claim 1, wherein the indentations of the surface contour are each approximately 2.5 mm wide and approximately 1.5 mm deep, and wherein the grooves are open counter to a direction of movement of the belt webbing such that they have no limiting wall on a front side, such that the grooves are delimited by a base, two opposing lateral side walls and a back side wall.

3. The belt fitting according to claim 1, wherein the clamping element is pivotable around a rotation axis between the release position and the clamping position and may be elastically pretensioned in a direction of the release position, and wherein the clamping element is pivotable into the clamping position in a rotation direction in the event of a load when higher belt forces are applied to the belt webbing.

4. The belt fitting according to claim 1, wherein the clamping element has a clamping contour with the aid of which the belt webbing may be tightly clamped in the clamping position.

5. The belt fitting according to claim 4, wherein the clamping element has the one of the two belt running surfaces, including the surface contour, and the clamping contour, and wherien the surface contour is disposed on the clamping element in a leading manner and the clamping contour is disposed thereon in a trailing manner, viewed in a rotation direction.

6. The belt fitting according to claim 4, a clamping piece that protrudes from the clamping element is provided with the clamping contour, and wherein the belt webbing is clamped between the clamping contour of the clamping piece and the clamping stop of the base segment in the clamping position.

7. The belt fitting according to claim 6, wherein the clamping piece extends along an axial direction of the clamping element and protrudes from the clamping element in a radial direction of the clamping element, wherein an apex of the clamping piece is provided at a middle portion of the clamping piece in the axial direction, the middle portion of the clamping piece corresponding with a middle portion of the clamping element, wherein descending arc segments of the clamping piece extend from the apex on either side thereof towards ends of the clamping element, wherein the apex and the arc segments form the clamping contour of the clamping piece and wherein the belt webbing is clamped between the apex of the clamping piece and the clamping stop of the base segment in the clamping position.

8. The belt fitting according to claim 1, wherein the surface contour extends continuously over the entire belt webbing width in a belt transverse direction.

9. A safety belt device for a vehicle, comprising the belt fitting according to claim 1.

* * * * *